United States Patent [19]
Ragan et al.
[11] Patent Number: 5,046,979
[45] Date of Patent: Sep. 10, 1991

[54] CHASSIS MODULE FOR MODEL AIRPLANE CONSTRUCTION

[76] Inventors: Lawrence H. Ragan, 1307 Chesterton Dr., Richardson, Tex. 75080; George S. Barker, 10827 Alladin, Dallas, Tex. 75229

[21] Appl. No.: 509,730

[22] Filed: Apr. 16, 1990

Related U.S. Application Data

[63] Continuation of Ser. No. 345,686, May 1, 1989, abandoned.

[51] Int. Cl.[5] .................... A63H 27/00; A63H 30/04; B64D 27/00

[52] U.S. Cl. ........................................ 446/57; 446/34; 446/456; 244/54

[58] Field of Search ................. 244/54, 120, 189, 190; 446/34, 56, 57, 58, 59, 60, 85, 87, 88, 93, 94, 95, 96, 454, 456

[56] References Cited

U.S. PATENT DOCUMENTS

| | | | |
|---|---|---|---|
| 2,783,003 | 2/1957 | Ralston et al. | 244/54 |
| 3,585,753 | 6/1971 | Purdy | 446/57 |
| 3,777,420 | 12/1973 | Bosley et al. | 446/58 |
| 3,784,174 | 1/1974 | Tarnofsky | 446/57 X |
| 3,803,758 | 4/1974 | Chang et al. | 446/58 |
| 4,406,085 | 9/1983 | Rhodes | 446/456 |
| 4,417,708 | 11/1983 | Negri | 244/120 X |
| 4,771,968 | 9/1988 | Perry | 244/54 |

FOREIGN PATENT DOCUMENTS

| | | | |
|---|---|---|---|
| 2305915 | 2/1974 | Fed. Rep. of Germany | 446/57 |
| 2728068 | 1/1979 | Fed. Rep. of Germany | 446/57 |
| 8601175 | 2/1986 | PCT Int'l Appl. | 244/120 |
| 2029245 | 3/1980 | United Kingdom | 446/57 |

OTHER PUBLICATIONS

Radio Control Modeler Magazine, Mar. 1987, p. 117.

*Primary Examiner*—David N. Muir
*Attorney, Agent, or Firm*—Richards, Medlock & Andrews

[57] ABSTRACT

A chassis module for removably mounting in an opening in the fuselage of a model airplane is arranged to support an engine, a radio, receiver, a fuel tank, a battery and servomechanisms controlled by the radio receiver to control the engine throttle and movable flight control surfaces on the model airplane. The module may include energy absorbers to provide protection to the chassis module and the components mounted thereto in the event of a crash of the model airplane. A magnetically operated latching reed switch is disclosed for applying and removing on-board battery power to the on-board electrical equipment by the use of a magnet brought near the vicinity of the switch from outside the model airplane.

10 Claims, 7 Drawing Sheets

CHASSIS MODULE FOR MODEL AIRPLANE CONSTRUCTION

This is a continuation of application Ser. No. 07/345,686 filed May 1, 1989, now abandoned.

BACKGROUND OF THE INVENTION

This invention relates in general to model airplanes. More particularly, it relates to apparatus and methods for modular construction which allow rapid exchange of the expensive components of model airplanes from one model airplane to another and also provide crash protection for such components.

DESCRIPTION OF THE PRIOR ART

Construction and flying of radio controlled (RC) model airplanes is a growing hobby. Miniaturization of the radio receiver and servomechanisms (servos) necessary for proportional control of flight control surfaces (ailerons, rudder, elevator), throttle, "bomb drops" and possibly landing gear, etc., has contributed to the growth of the hobby.

A person interested in entering the hobby is faced with a number of barriers. Many different kits are available in various stages of completion of the necessary construction work. The basic kits include most of the necessary materials and instructions. In addition to the materials which are provided, one must purchase covering for the airframe, wheels, paint, radio and servos, battery, engine and various small parts. Not all potential pilots possess the skills necessary to successfully construct a model aircraft. An attempt to meet this need is represented in the more finished kits which are called "Almost Ready To Fly" (ARF). The covering, wheels, etc., are provided in these kits but substantial assembly is still required, including the purchase and installation of radio, servos, engine, fuel tank, etc. Some assembly of the airframe is required as well. These tasks typically require ten to fifteen hours from a skilled modeler and substantially more from a novice. The need exists for "Really Ready to Fly" aircraft which can be purchased and flown by novices.

Modeling enthusiasts inevitably require more than one aircraft. Learning to remotely control a flying model properly is a challenge and is part of the appeal of the hobby. It is almost certain that numerous crashes will occur during this process. Many of the crashes will result in minor damage which can be repaired if one has the construction skills. For this reason, most novices are advised to build their first models from basic kits to develop the skills necessary to repair damaged models. Of course, some crashes are so devastating that rebuilding is impractical and the model must be scrapped. It is rare that the expensive parts of the model airplane (the engine, radio, servos, battery, etc.) are seriously damaged. Those parts are salvaged for subsequent models. The need exists for aircraft which are either very rugged and resistant to damage or are low enough in cost (both in money and time) such that they can be scrapped without undue anguish.

As one becomes more proficient in flying model airplanes, additional aircraft are required for variety. The simple, slow, easier to fly "trainer" aircraft which are best for learning to fly become uninteresting to fly as they are incapable of many of the aerobatics and higher speeds which provide additional fun and excitement. There are often other family members or friends who are at different skill levels and require different aircraft. The installation of engines, radios, servos and batteries is quite tedious and time consuming. Although it is possible to exchange these expensive components from one model to another, it is rarely done except when scrapping the model from which the parts are removed. The result is that modelers must purchase multiple units of radios (including the transmitter), servos, engines, batteries and fuel tanks with one set being used with each model which is maintained in flyable condition. This factor makes the hobby prohibitively expensive for many who would otherwise participate. The need exists for means to rapidly exchange the expensive components between various model airplanes so as to lower the cost of the hobby.

The present invention is intended to provide a solution to various prior art deficiencies which include the need to either purchase the expensive components (engine, radio, receiver, fuel tank, servos and battery) for each model airplane or remove the expensive components into a different model airplane each time a different model airplane is flown. Prior art construction of model airplanes results in model airplanes which are not very resistant to damage when they crash. Prior art model airplanes are relatively expensive to build and equip with the necessary components.

SUMMARY OF THE INVENTION

The present invention provides a chassis module structured for removably mounting in an opening in the fuselage of a model airplane. The chassis module comprises a first portion and a second portion. Structure is provided for removably attaching at least one wing and a landing gear to the second portion. Structure is provided for removably attaching an engine mount to the first portion. Structure is provided for removably mounting a fuel tank within the volume defined by the first portion. Structure is provided for removably mounting components including a radio receiver, control surface servomechanism apparatus and a battery within the volume defined by the second portion.

The chassis module includes energy absorption means to provide protection to the chassis module and the components mounted therein in the event of a crash of the model airplane. In one embodiment the energy absorption means comprises a slow-return distensible foam material positioned between the engine mount and the first portion of the chassis module. In another embodiment the energy absorption means comprises a predetermined number of metal tubes operatively positioned and mounted in the chassis module and a predetermined number of extensions, each having tapered end portions, which are mounted on the engine mount and positioned coaxially with respect to the metal tubes so that upon impact of the model airplane with an immovable object the tapered end portions of the extensions are driven into the metal tubes causing the metal tubes to expand in diameter and thereby absorb the energy of the impact.

Among the advantages offered by the present invention is the ability to easily and rapidly transfer the expensive components (engine, radio receiver, fuel tank, servos and battery) from one model airplane to another model airplane. The present invention also allows model airplanes to be constructed which are so inexpensive that they may be scrapped if and when they crash. The present invention provides structure which makes a model airplane more resistant to damage upon a crash and provides means to easily and quickly remove power from the radio receiver and the servos from outside the model airplane to conserve battery power.

Examples of the more important features and advantages of the invention have thus been summarized rather broadly in order that the following detailed description thereof may be better understood and in order that the contribution to the art may be better appreciated. There are, of course, additional features of the invention which will be described hereinafter and which will also form the subject of the claims appended hereto. Other features of the invention will become apparent with reference to the following detailed description of a presently preferred embodiment thereof in connection with the accompanying drawing in which:

DESCRIPTION OF THE PREFERRED EMBODIMENT

Figure 1:
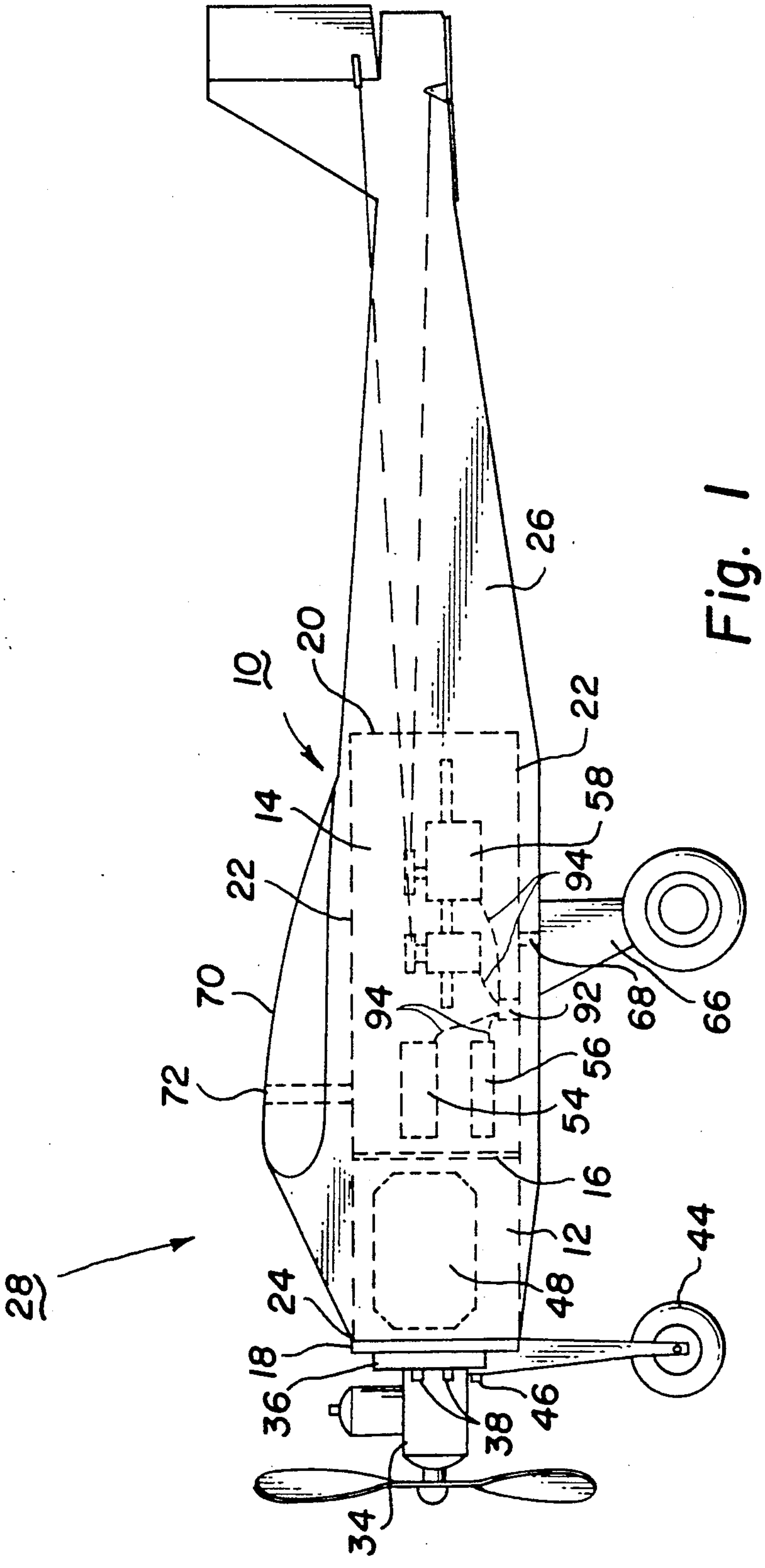
FIG. 1 is a simplified side elevational view of a model airplane embodying the present invention.
Figure 2:
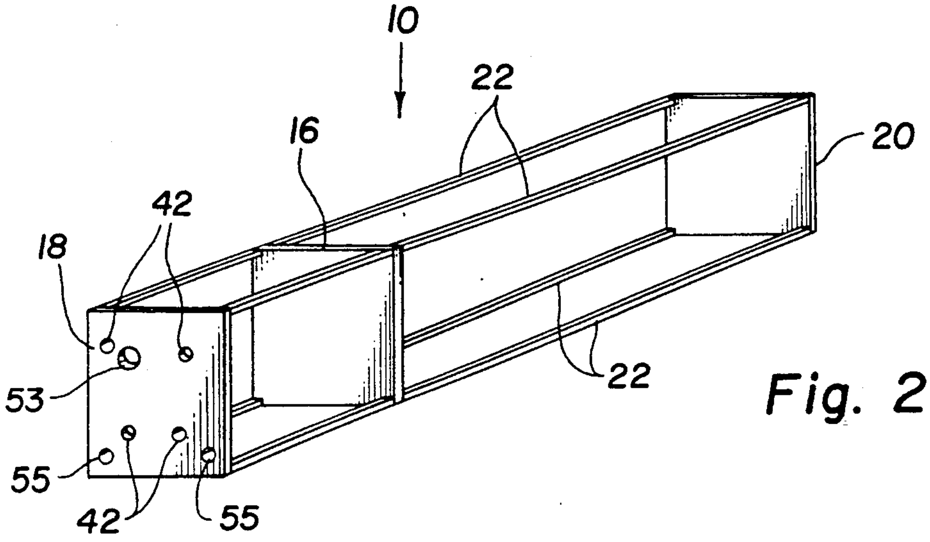
FIG. 2 is a simplified perspective view of the module of the invention.
Figure 3:
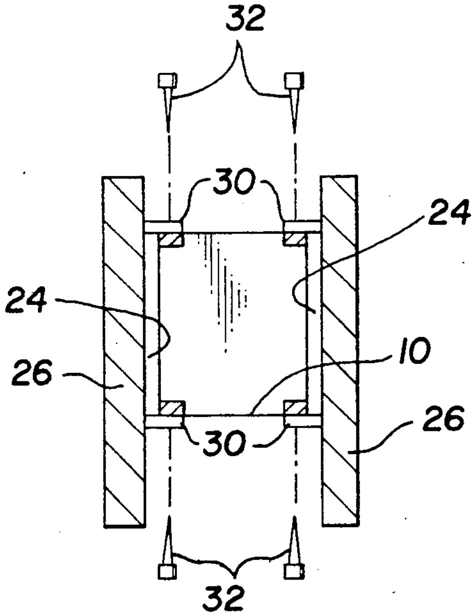
FIG. 3 is a simplified end elevational view of the module installed in the fuselage of a model airplane.
Figure 4:
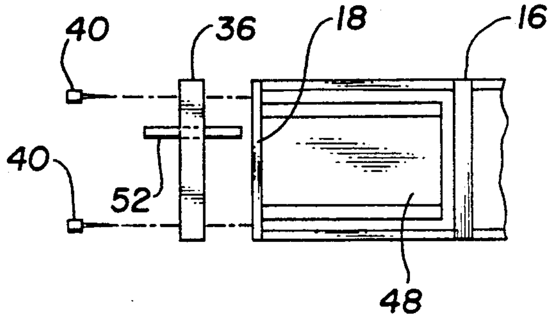
FIG. 4 is a simplified side elevational view of the first portion of the module.
Figure 5:
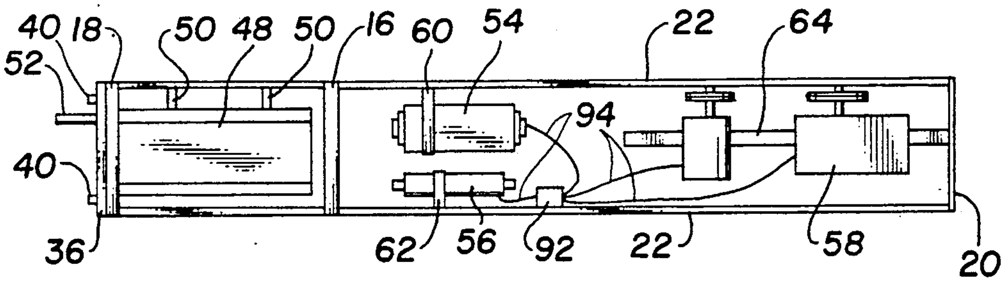
FIG. 5 is a simplified side elevational view of the module of the invention illustrating various components installed therein.

Referring now to the drawing, and in particular to FIGS. 1 to 5, a chassis module according to the present invention is referred to generally by reference numeral 10. In the preferred embodiment chassis module 10 comprises a unitary structure comprising a front portion 12 and a rear portion 14 and rectangular in shape. It will be appreciated that chassis module 10 could be triangular, oval, circular, etc., in shape as viewed in cross section from an end thereof. Bulkhead 16 provides additional structural support to chassis module 10 but is not considered mandatory. Firewall 18 is mounted on the front end of front portion 12. Rear wall 20 is mounted on the rear end of rear portion 14. Longitudinal beams 22 are supported by and connect firewall 18, bulkhead 16 and rear wall 20.

It will be appreciated that the longitudinal beams 22 could be replaced with solid wall portions (with cutouts therein to allow access to predetermined components mounted therein) to support and connect firewall 18, bulkhead 16 and rear wall 20, if it is decided to include bulkhead 16. It will also be appreciated that rear wall 20 may not be necessary.

Opening 24, formed in the fuselage 26 of model airplane 28, is shaped and formed to receive chassis module 10. In the preferred embodiment slide rails 30 are attached to the sides of fuselage 26 to slidably receive the chassis module 10 which is removably mounted therein by fastening means 32. In the preferred embodiment fastening means 32 comprises threaded screws which cooperate with threaded apertures formed in chassis module 10.

The primary structural integrity of the fuselage of the model airplane resides in the very strong, lightweight chassis module 10 which is removable as a unit from the model airplane. In the disclosed embodiment the chassis module 10 slides into the model airplane from the front. It will be appreciated that the chassis module 10 could be slidably mounted in the fuselage from the top or bottom also. For pusher type model airplanes, the chassis module 10 would be slidably inserted into the fuselage from the rear of the plane (with the engine oriented toward the rear of the airplane).

Engine 34 is removably mounted to engine mount 36 by fastening means 38. In the preferred embodiment, fastening means 38 comprises bolts and cooperating nuts together with apertures (not shown) formed in the engine mount 36. Engine mount 36 is removably mounted to the fire wall 18 of front portion 12 by fastening means 40. In the preferred embodiment, fastening means 40 comprises bolts and cooperating nuts together with apertures 42 formed in the fire wall 18. Nose wheel 44 is removably mounted to engine mount 36 by fastening means 46.

In this application predetermined components removably mounted on or within chassis module 10 may include some of but are not limited to fuel tank 48, radio receiver 54, batteries or battery power source 56 and control-surface servomechanism apparatus 58.

Fuel tank 48 is mounted in front portion 12 by fastening means 50. Fill tube 52 passes through aperture 53 in fire wall 18 to operatively connect fuel tank 48 with engine 34. Apertures 55 in firewall 18 provide clearance for throttle, nosewheel steering, etc., linkages to pass therethrough.

Radio receiver 54, batteries or battery power source 56 and control surface servomechanism apparatus 58 necessary to control the throttle, rudder, elevator and possibly the ailerons are mounted in rear portion 14 by fastening means 60, 62 and 64, respectively. In the preferred embodiment fastening means 64 comprises a slide-in rail. The control linkages required to operate the throttle and nosewheel are mounted in the rear portion 14. The control linkages required for operation of the rudder, elevator and possibly the ailerons remain with the fuselage 26 and are connected to the control surface servomechanism apparatus 58 after the chassis module 10 is removably mounted within the fuselage 26. Landing gear 66 is removably attached to the chassis module 10 by fastening means 68. Wing 70 is removably attached to the chassis module 10 by fastening means 72.

It will be appreciated that the various fastening means could comprise various conventional fasteners including bolts or screws in conjunction with nuts, threaded bosses in conjunction with nuts, bolts or screws in conjunction with threaded apertures, pins in conjunction with cotter keys, etc.

To prepare the model airplane 28 for flight it is only necessary to slide the chassis module 10 in place within the fuselage 26, install fastening means 32, attach the wing 70 and connect the rudder, elevator and aileron control linkages.

Numerous types of model airplanes can be constructed around the chassis module 10 if the fuselage 26 is designed to accept the chassis module 10. For models of historical aircraft which do not have a nosewheel, the landing gear is attached further forward on the chassis module 10 and the nosewheel 44 is removed from the aircraft. A tailwheel or tailskid is then provided as part of the model airplane and is not attached to the chassis module 10. The chassis module 10 may be used with low wing, high wing and multi-wing models.

Because the chassis module 10 provides structural integrity for the aircraft in which it is installed, the aircraft can be made of inexpensive materials and can be discarded when severely damaged in a crash without undue cost to the hobbyist. The aircraft can be made of a plastic foam material or corrugated paperboard, for example.

Since the chassis will be used in numerous model airplanes or aircraft, it can be made of more expensive, tougher materials such as carbon filament composites or fiber-filled plastics so that the chassis module will be almost certain to survive all but the most violent crashes with little or no damage.

The chassis module 10 may be further protected from crash damage by incorporating energy absorption apparatus with the chassis module 10. With reference to FIGS. 6 to 10, two devices and methods are disclosed for providing the additional protection.

The first method dissipates the energy of the moving model airplane upon the occurence of a crash by causing the energy to distort disposable metal tubes associated with the chassis module 10. Engine mount 74 includes a predetermined number of extensions or tube expanders 76 extending therefrom. Extensions or tube expanders 76 include a tapered end portion 78. In the preferred embodiment four extensions or tube expanders 76 are used. Front section 80 is attached to fire wall 18 and extends therefrom. Front section 80 includes four resilient catches 82 positioned at the outer periphery of the front portion. In the preferred embodiment the resilient catches 82 are formed of appropriate plastic material. A disposable metal tube 84 is positioned generally in each corner of front section 80. The opening or cavity 86 formed by the protruding resilient catches 82 is shaped to accept engine mount 74 so that the extensions or tube expanders 76 are coaxial with disposable metal tubes 84 with the tapered end portion 78 extending into the opening of the disposable metal tube. The disposable metal tubes 84 are similar to spent rifle cartridges. The energy from a crash is absorbed by the disposable metal tubes 84 due to stretching and tearing of the tubes as the tapered end portions 78 are driven further into the openings in the disposable metal tubes 84. The extensions or tube expanders 76 in cooperation with the disposable metal tubes 84 also serve to provide lateral stability to the engine mount 74.

The second method dissipates the energy of the moving model airplane upon the occurrence of a crash by including an energy absorption or crushable material 88 in the space 90 between the engine mount 74 and the fire wall 18 or the front end of front portion 12. This material must be one which does not give back its absorbed energy in a short period of time (not until at least the shock echoes of the crash in the structure have died out). This can be accomplished by using a material which permanently distorts, such as a polystyrene foam material, or one with a slow recovery.

Figure 6:
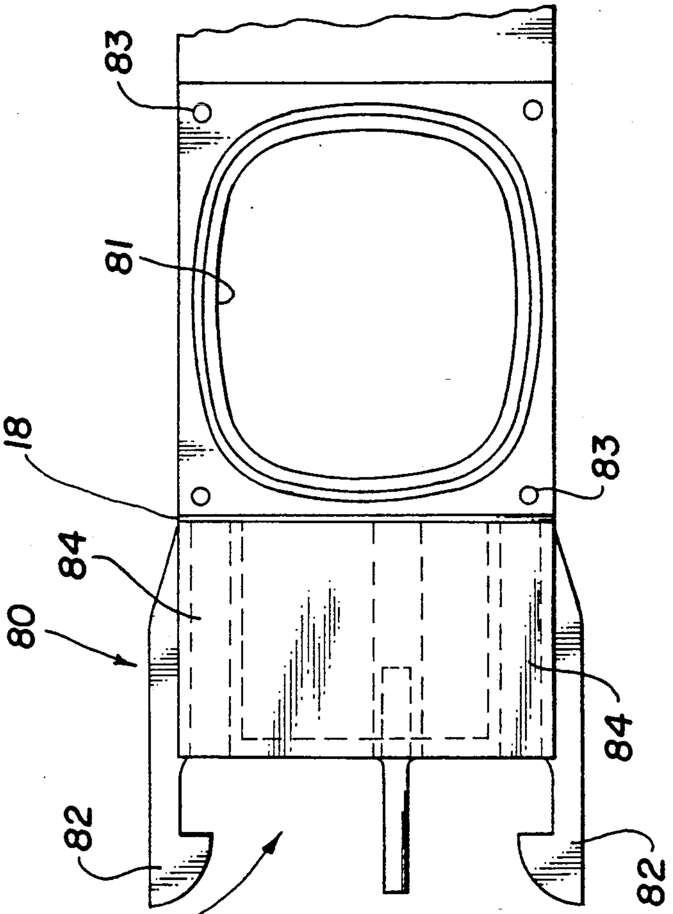
FIG. 6 is a simplified top plan view of an additional embodiment of the invention.
Figure 7:
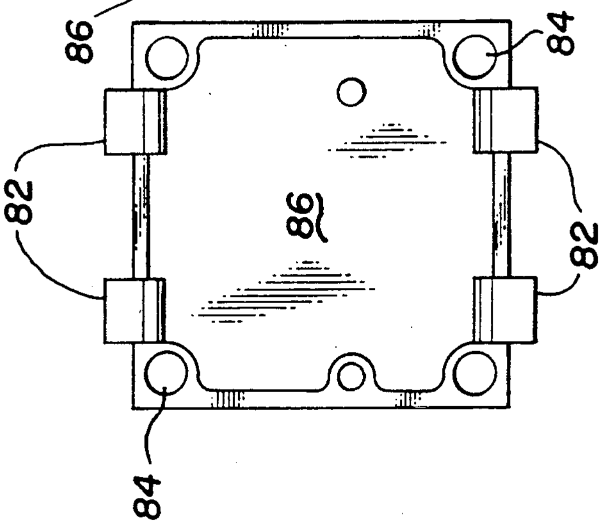
FIG. 7 is a simplified end elevational view of the additional embodiment of FIG. 6.
Figure 8:
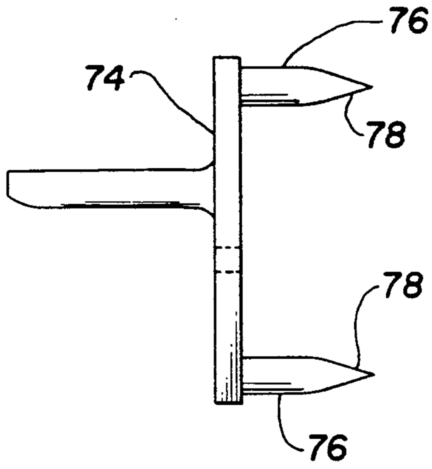
FIG. 8 is a simplified side elevational view of an additional embodiment of the engine mount of the invention.
Figure 9:
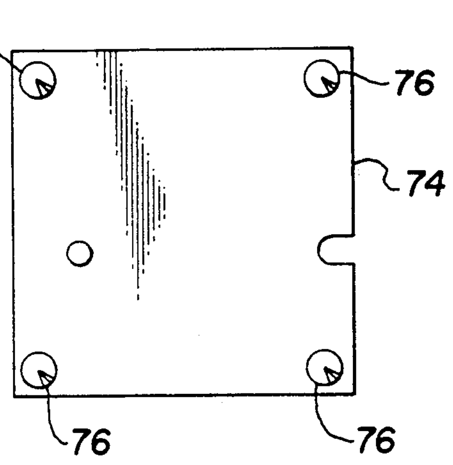
FIG. 9 is a simplified end elevational view of the additional embodiment of the engine mount of FIG. 8.
Figure 10:
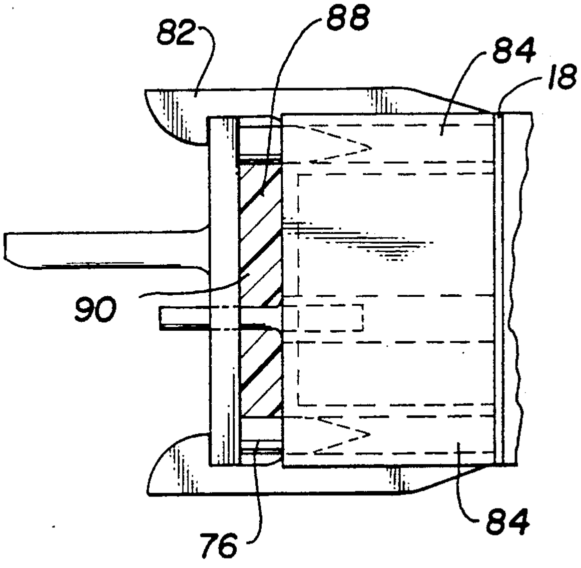
FIG. 10 is a simplified side elevational view showing the additional embodiment engine mount mounted to the module of the invention.

It will be appreciated that engine mount 74 shown in FIGS. 8 and 9 mates with the front section 80 of the additional embodiment of chassis module 10 shown in FIGS. 6 and 7. FIG. 10 shows the mated relationship.

With further reference to FIG. 6, aperture 81 is provided in the chassis module 10. Four apertures 83 positioned around aperture 81 allow a plate (not shown) to be attached to chassis module 10 to cover and close aperture 81. This feature provides the capability to provide a built in fuel tank with the chassis module 10.

Batteries or battery power source 56 are usually sufficient to power the radio receiver 54 and the servo apparatus 58 for two to three hours of flying without recharging. Most modelers provide means to turn the radio receiver 54 (together with the servo apparatus 58) off from outside the model airplane (when not flying) to maximize the time between battery recharging. The on-board electrical equipment is left off until just before flight begins and is turned off immediately after the flight ends. When the chassis module 10 is installed by removably mounting it into the compatible model airplane, it is desirable to provide means to switch the batteries or battery power source 56 off and/or on. This can be accomplished by removing the wing 70 and reaching in to operate an internal mechanical switch or by inserting a mechanical linkage through the fuselage 26 and chassis module 10 to an internal mechanical switch. Both of these methods are cumbersome and time consuming.

This invention provides a better means and method for controlling the application of power to on-board electrical equipment in a model from a battery or battery power source 56 and comprises a concealed switch 92. In the preferred embodiment, concealed switch 92 comprises a SPDT magnetically operated latching switch.

Figure 11:
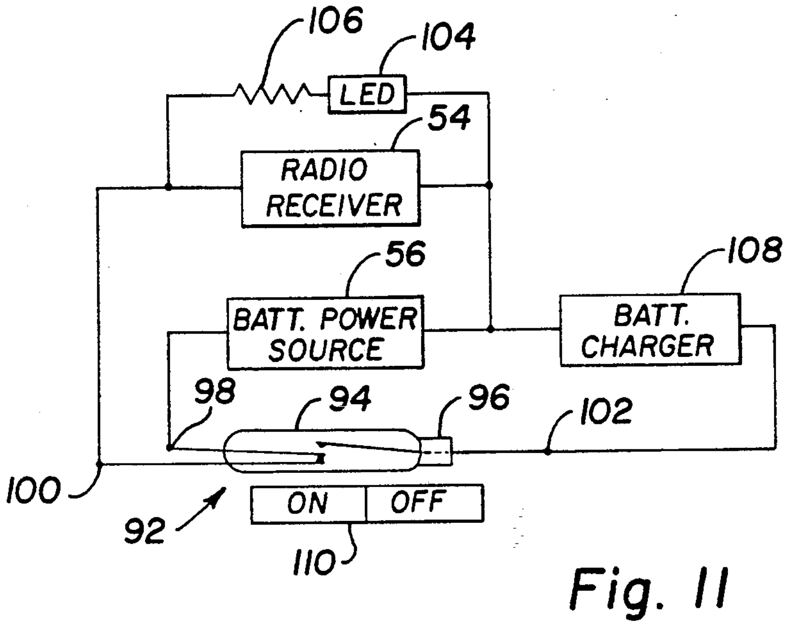
FIG. 11 is a simplified schematic diagram of the preferred embodiment of the concealed switch of the present invention.

With reference to FIG. 11, concealed switch 92 comprises a glass bulb 94 with a biasing magnet 96 located at one end thereof. Leads 98, 100 and 102 (with associated contacts) exit from glass bulb 94 with lead 98 being the common lead whose contact is switched between lead 100 and 102 when the concealed switch 92 is activated by subjecting the concealed switch 92 to an appropriate magnetic field which may be accomplished by bringing a permanent magnet (with proper orientation) into proximity to the concealed switch 92. A series circuit comprising battery power source 56 and radio receiver 54 is connected between leads 98 and 100. A series circuit comprising LED (light-emitting diode) 104 and resistor 106 is connected in parallel with radio receiver 54. A series circuit comprising battery power source 56 and battery charger 108 is connected between leads 98 and 102. As will be discussed below with reference to FIG. 12, battery charger 108 is only connected in the circuit to charge the battery power source 56 when the model is not being used.

In operation, when the proper pole (ON) of permanent magnet 110 is brought in close proximity to concealed switch 92 and with the proper orientation, concealed switch 92 is activated such that the contact associated with lead 98 is connected to the contact associated with lead 100 to complete the series circuit and battery power is applied to radio receiver 54. Concealed switch 92 is latched in this position or configuration until the opposite pole (OFF) is properly oriented and brought into close proximity to concealed switch 92. The contact associated with lead 98 is then shifted over and is connected to the contact associated with lead 102 (and is latched in this position) and battery power is removed from radio receiver 54 while the battery power source 56 is operatively connected in series with battery charger 108 (if it is connected in the circuit).

Figure 12:
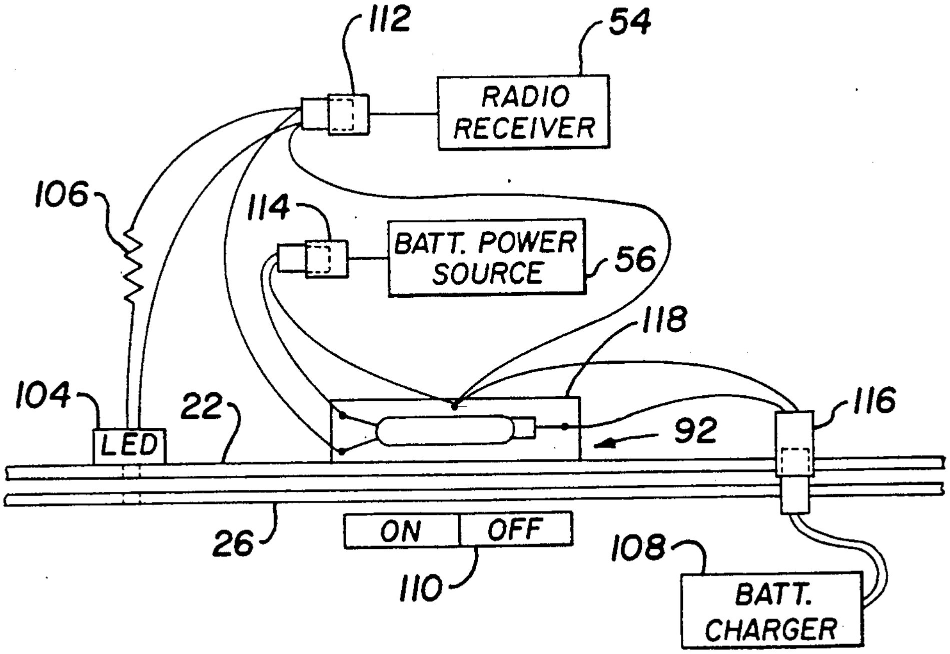
FIG. 12 is a simplified pictorial diagram showing the manner in which the concealed switch of the present invention may be incorporated into the module of the present invention.

With reference to FIG. 12, concealed switch 92 is connected in the overall circuit with appropriate electrical plugs 112, 114 and 116 so the radio receiver 54 and/or the battery power source 56 may be easily removed and replaced as needed and so the battery charger 108 may be connected to charge the battery power source 56 when the model airplane is on the ground or the model boat is on shore. Concealed switch 92 is mounted on board 118 which is mounted inside the chassis module 10 or the fuselage 26 of a model airplane or inside the hull of a model boat (all of which are made of non-magnetic materials) so it is not visible from outside the model. When the LED 104 is lit, the operator knows that concealed switch 92 is in the position whereby battery power is applied to radio receiver 54. In FIG. 12 concealed switch 92 is shown mounted in an orientation which is parallel with the longitudinal axis of the model but it will be appreciated that concealed switch 92 may be mounted in numerous other orientations without affecting the operation thereof.

It will be appreciated that the magnetic flux lines associated with permanent magnet 110 are continuous from one pole to the opposite pole. The magnetic field is a vector quantity with the direction of the magnetic field being parallel with the magnetic flux lines. The component of the magnetic field which is longitudinal with respect to the concealed switch 92 activates the switch. The orientation between concealed switch 92 and permanent magnet 110 is only limited by the strength of the longitudinal component of the magnetic field which encompasses the concealed switch 92. Therefore, any orientation between concealed switch 92 and permanent magnet 110 will cause operation of the switch if the longitudinal component of the magnetic field which encompasses the concealed switch 92 has sufficient strength. If the concealed switch 92 is mounted in the model as shown in FIG. 12, then one of the better orientations for the permanent magnet 110 to operate concealed switch 92 is as shown in FIG. 12. If the concealed switch 92 was installed with an orientation of 90° from that shown in FIG. 12, then one of the better orientations for the permanent magnet 110 to operate concealed switch 92 is 90° from that shown in FIG. 12.

Permanent magnet 110 is held adjacent the location of the concealed switch 92 in one orientation to turn the concealed switch 92 on and connect the battery power source 56 to the radio receiver 56 and is held in the opposite orientation to turn the concealed switch 92 off and remove the battery power source 56 from the radio receiver 56. Glass bulb 94 provides a hermetic seal which helps to increase the reliability of the concealed switch 92. This is even more important in model boats since switches normally used in models will normally corrode when exposed to water.

The concealed switch 92 has value to modelers who do not use a chassis module 10 in their model airplane but are interested in exact scale appearance of their model airplane. The presence of an external switch is difficult if not impossible to disguise. Modelers utilize wires through simulated guns, etc. to avoid the undesirable appearance of a switch. The concealed switch 92 solves this problem.

Figure 13:
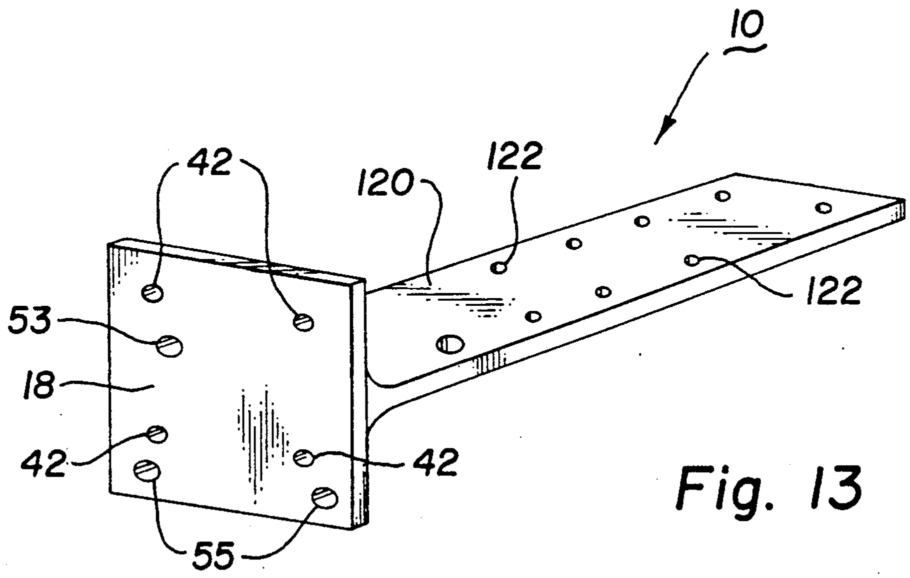
FIG. 13 is a simplified perspective view of an additional embodiment of the module.
Figure 14:
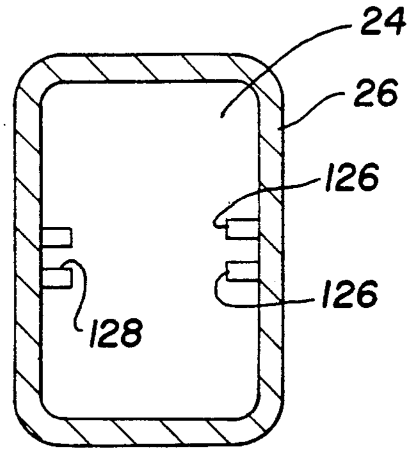
FIG. 14 is a simplified end elevational view of the fuselage of a typical model aircraft structured to receive the additional embodiment of the module as shown in FIG. 13.

With reference to FIGS. 13 and 14, an additional embodiment of chassis module 10 is disclosed and consists of a unitary structure comprising a firewall 18 and a rear platform 120 extending therefrom. Rear platform 120 comprises a generally rectangular panel attached to one side of firewall 18 at the horizontal centerline thereof. It will be appreciated that firewall 18 and rear platform 120 could be molded as a single item or rear platform 120 could be attached to firewall 18 after being formed.

Apertures 42 are formed in firewall 18 as part of fastening means to mount engine mount 36 thereto. Aperture 53 in firewall 18 allows fill tube 52 to pass therethrough to operatively connect to fuel tank 48 which is removably mounted to rear platform 120 by fastening means cooperating with predetermined number of apertures 122. In this embodiment it will be appreciated that the fastening means could comprise straps, screws, bolts, tabs, etc.

Rear platform 120 includes numerous apertures 122 positioned at predetermined locations to cooperate in the mounting of fuel tank 48, radio receiver 54, batteries or battery power source 56 and control surface servomechanism apparatus 58.

With reference to FIG. 14, mounting means 124 for removably mounting chassis module 10 within an opening 24 of fuselage 26 is disclosed and comprises mounting rails 126 attached to fuselage 26 in predetermined locations to provide slots 128 to slidably receive the rear platform 120 of chassis module 10.

Although the invention has been described herein with reference to specific forms thereof, it is evident that many alternatives, modifications and variations will become apparent to those skilled in the art in light of the foregoing disclosure. Accordingly, this description is to be construed as illustrative only and is for the purpose of teaching those skilled in the art the manner of carrying out the invention. It is to be understood that the forms of the invention herewith shown and described are to be taken as presently preferred embodiments. Various changes may be made in the shape, size and arrangement of parts. For example, equivalent elements may be substituted for those illustrated and described herein, parts may be reversed, and certain features of the invention may be utilized independently of other features of the invention. It will be appreciated that various modifications, alternatives, variations, etc., may be made without departing from the spirit and scope of the invention as defined by the appended claims.

what is claimed:

1. For use in a model airplane having a fuselage and control means for selectively positioning movable flight control surfaces, a longitudinally removable module comprising:

(a) a support body adapted to be removably mounted longitudinally within a forward opening in the fuselage of the model airplane;

(b) a radio receiver mounted on said support body;
(c) servo means controlled by said radio receiver mounted on said support body and adapted for interconnection with the control means for selectively positioning movable flight control surfaces of the model airplane;
(d) battery means mounted on said support body and operatively interconnected to supply electrical power to said servo means and said radio receiver;
(e) an engine and means for mounting the engine on said support body and a fuel container mounted on said support body for supplying fuel to said engine; and
(f) second servo means mounted on said support body operatively interconnected with a throttle control means for said engine controlled by said radio receiver.

2. The combination comprising:
(a) a model airplane having a fuselage with a forward opening therein;
(b) movable flight control surfaces operable by control means within said fuselage;
(c) a longitudinally removable support module mounted within said opening in said fuselage;
(d) a radio receiver mounted on said support module;
(e) servo means mounted on said support module controlled by said radio receiver and removably operatively interconnected with said control means;
(f) electrical power means mounted on said support module and operatively interconnected to supply electrical power to said servo means and said radio receiver;
(g) a model airplane engine mounted on said support module; and
(h) throttle control means responsive to said radio receiver and operatively connected to a throttle of said model airplane engine.

3. The combination set forth in claim 2 including fuel means for said model airplane engine mounted on said support module.

4. For use in a model airplane having a fuselage and control means for selectively positioning movable flight control surfaces, a removable module comprising:
(a) a support body adapted to be longitudinally removably mounted within a forward opening in the fuselage of the model airplane;
(b) a radio receiver mounted on said support body;
(c) means for mounting an engine having a throttle on said support body;
(d) fuel means mounted on said support body for supplying fuel to said engine;
(e) servo means mounted on said support body operatively interconnected with a throttle control means for said engine controlled by said radio receiver; and
(f) battery means mounted on said support body and operatively interconnected to supply electrical power to said servo means and said radio receiver.

5. The combination comprising:
(a) a model airplane having a fuselage with a forward opening therein;
(b) movable flight control surfaces operable by control means within said fuselage;
(c) a support module longitudinally removably mounted within said opening in said fuselage;
(d) a radio receiver mounted on said support module;
(e) servo means controlled by said radio receiver and operatively interconnected with said control means;
(f) electrical power means mounted on said support module and operatively interconnected to supply electrical power to said servo means and said radio receiver;
(g) a model airplane engine having a throttle mounted on said support module; and
(h) a throttle control means responsive to said radio receiver and operatively connected to a throttle of said model airplane engine.

6. The combination set forth in claim 5 including fuel means for said model airplane engine mounted on said support module.

7. A model airplane comprising:
(a) a fuselage including an opening therein;
(b) a chassis module having structure which is adapted to be removably mounted within said opening;
(c) an engine mount removably attached to said chassis module;
(d) an engine removably attached to said engine mount;
(e) a fuel tank removably mounted within the structure of the chassis module;
(f) a radio receiver removably mounted within the structure of the chassis module;
(g) control surface servomechanism apparatus removably mounted within the structure of the chassis module;
(h) a battery removably mounted within the structure of the chassis module; and
(i) a slow-return distensible foam material positioned between said engine mount and said chassis module.

8. A model airplane comprising:
(a) a fuselage including an opening therein;
(b) a chassis module having structure which is adapted to be removably mounted within said opening;
(c) an engine mount removably attached to said chassis module;
(d) an engine removably attached to said engine mount;
(e) a fuel tank removably mounted within the structure of the chassis module;
(f) a radio receiver removably mounted within the structure of the chassis module;
(g) control surface servomechanism apparatus removably mounted within the structure of the chassis module;
(h) a battery removably mounted within the structure of the chassis module; and
(i) energy absorbtion means operatively positioned between said engine mount and said chassis module comprising a predetermined number of metal tubes operatively positioned and mounted in the chassis module and a predetermined number of extensions, each having tapered end portions, mounted on said engine mount and positioned coaxially with respect to said predetermined number of metal tubes such that upon impact of the model airplane with an immovable object the tapered end portions of the predetermined number of extensions are driven into the predetermined number of metal tubes causing the predetermined number of metal tubes to expand in diameter and thereby absorb impact energy.

9. In combination with a model airplane including a fuselage with an opening therein, at least one wing, a landing gear, an engine mount, an engine, a fuel tank, a radio receiver, control surface servomechanism apparatus and a battery, a chassis module comprising:

(a) a front portion;

(b) a rear portion;

said front portion and said rear portion being structured to be removably mounted within said opening;

(c) means for removably mounting said chassis module in said opening of said fuselage;

(d) means for removably attaching said engine mount to said front portion;

(e) means for removably mounting predetermined components to said rear portion; and (f) a slow-return distensible foam material position between said engine mount and said chassis module.

10. In combination with a model airplane including a fuselage with an opening therein, at least one wing, a landing gear, an engine mount, an engine, a fuel tank, a radio receiver, control surface servomechanism apparatus and a battery, a chassis module comprising:

(a) a front portion;

(b) a rear portion;

said front portion and said rear portion being structured to be removably mounted within said opening;

(c) means for removably mounting said chassis module in said opening of said fuselage;

(d) means for removably attaching said engine mount to said front portion;

(e) means for removably mounting predetermined components to said rear portion; and (f) energy absorption means operatively positioned between said engine mount and said chassis module comprising a predetermined number of metal tubes operatively positioned and mounted in the chassis module and a predetermined number of extensions, each having tapered end portions mounted on said engine mount and positioned coaxially with respect to said predetermined number of metal tubes such that upon impact of the model airplane with an immovable object the tapered end portions of the predetermined number of extensions are driven into the predetermined number of metal tubes causing the predetermined number of metal tubes to expand in diameter and thereby absorb impact energy.

* * * * *